(12) United States Patent
Inkster

(10) Patent No.: US 7,210,549 B2
(45) Date of Patent: May 1, 2007

(54) AIR BOARD

(75) Inventor: Kevin Ross Inkster, Perth (AU)

(73) Assignee: Arbortech Industries Ltd., Malaga, Western Australia (AU)

( * ) Notice: Subject to any disclaimer, the term of this patent is extended or adjusted under 35 U.S.C. 154(b) by 178 days.

(21) Appl. No.: 10/639,755

(22) Filed: Aug. 13, 2003

(65) Prior Publication Data

US 2005/0016783 A1 Jan. 27, 2005

Related U.S. Application Data

(63) Continuation of application No. 10/018,092, filed as application No. PCT/AU00/00664 on Jun. 15, 2000, now abandoned.

(30) Foreign Application Priority Data

Jun. 15, 1999 (AU) .................................. PQ0981

(51) Int. Cl.
*B60V 1/00* (2006.01)
(52) U.S. Cl. .................... 180/116; 180/117; 180/127
(58) Field of Classification Search ................ 180/116, 180/117, 119, 120, 127, 128
See application file for complete search history.

(56) References Cited

U.S. PATENT DOCUMENTS

| 3,398,809 A | | 8/1968 | Wood et al. ............... 180/119 |
| 3,416,626 A | | 12/1968 | Nagamatsu ................. 180/128 |
| 3,561,558 A | * | 2/1971 | Parkhouse .................. 180/120 |
| 3,591,084 A | * | 7/1971 | Ahren ........................ 239/114 |
| 3,662,851 A | | 5/1972 | Ramsey ...................... 180/127 |
| 3,850,126 A | * | 11/1974 | Leonard ..................... 180/121 |
| 4,063,611 A | * | 12/1977 | Anderson ................... 180/119 |
| 4,077,589 A | * | 3/1978 | Belolipetsky et al. ... 244/100 A |
| 4,096,921 A | * | 6/1978 | Guienne ..................... 180/121 |
| RE30,694 E | * | 8/1981 | Riddle ........................ 180/128 |
| 4,282,946 A | * | 8/1981 | MacGuire ................... 180/128 |
| 4,313,512 A | | 2/1982 | Jutras ......................... 180/117 |
| 4,416,346 A | * | 11/1983 | Logan ........................ 180/119 |
| 4,427,086 A | * | 1/1984 | de Coiselet (de F.) ...... 180/119 |
| 4,518,054 A | * | 5/1985 | de la Cruz Toran ........ 180/118 |
| 4,718,501 A | | 1/1988 | Lawler ....................... 180/127 |
| 4,843,991 A | * | 7/1989 | Morash ...................... 180/118 |
| 4,862,984 A | | 9/1989 | Onizaki et al. ............. 180/127 |
| 4,964,835 A | * | 10/1990 | Suto .......................... 446/154 |
| 5,158,033 A | * | 10/1992 | Evans ........................ 180/120 |
| 5,370,197 A | * | 12/1994 | Goodwin et al. .......... 180/117 |
| 5,941,331 A | * | 8/1999 | Gastesi ...................... 180/120 |

FOREIGN PATENT DOCUMENTS

CA 2187678 11/1998
JP 1-293266 A1 11/1989

* cited by examiner

*Primary Examiner*—Lesley D. Morris
*Assistant Examiner*—Marc A. Scharich
(74) *Attorney, Agent, or Firm*—Finnegan, Henderson, Farabow, Garrett & Dunner, L.L.P.

(57) ABSTRACT

An air board including a platform upon which an operator of the vehicle can be supported; and a support arrangement for providing an air flow for supporting the platform above a surface, wherein the direction of movement of the air board is at least partially controlled by varying the weight distribution of the operator on the platform.

16 Claims, 4 Drawing Sheets

AIR BOARD

This is a continuation of application Ser. No. 10/018,092, filed Dec. 14, 2001 now abandoned, which is 371 of PCT/AU00/00664, filed Jun. 15, 2000, all of which are incorporated herein by reference.

The present invention is directed to vehicles such as snow boards, surf boards and skateboards.

Recreational vehicles of the type cited have several characteristics in common. Generally they are unpowered and thus are motivated by gravity or by the user. Second, the direction of movement of such vehicles is controlled by the user varying their weight distribution on the vehicle, and thus biasing the vehicle in the desired direction. Thirdly, they are surface specific, having specific shapes, sizes or most importantly, the type of contact with the relevant surfaces. Thus, a snow board is relatively small and has a flat smooth bottom surface for contact with snow, a skate board is also relatively small and uses small diameter wheels to run across a smooth rigid surface, whereas a surf board is relatively large for buoyancy and has a shaped smooth surface for contact with the water.

It would therefore be advantageous to provide a recreational vehicle which can be used over a variety of surfaces.

It is therefore an object of the present invention to provide a vehicle that can travel over a variety of surfaces.

With this in mind, there is provided an air board including a platform upon which an operator of the vehicle can be supported; and a support arrangement for providing an air flow for supporting the platform above a surface:
wherein the direction of movement of the air board is at least partially controlled by varying the weight distribution of the operator on the platform.

The air board according to the present invention can for example be used over grass and gravel as well as smooth solid surfaces and snow because the air board can hover above the noted surfaces when in operation.

The operator of the air board can stand, crouch or sit on the platform and can control the direction of motion of the vehicle by changing the weight distribution of the operator on the platform. This weight distribution change can for example be achieved where the operator is standing by transferring the body weight onto one foot. The subsequent differential alignment of the air board creates a differential gap between the skirt and the surface such that the air flow is directed through the enlarged gap. The reactive force caused by the release of the air flow will drive the air board in a direction opposed from the differential air flow. This acceleration will be impeded if sufficient distribution of weight brings the skirt in contact with the surface. The air board may turn in the direction where the weight is transferred in a similar manner to a skateboard or toboggan, a "point of rotation" being provided where the weight is concentrated causing said contact between the skirt and the surface.

To assist in the control of the air board the operator may be supported by handle means attached to the air board, and possibly located towards a forward portion of the air board. The transfer of weight may be made easier and more positive by the operator reacting against the handle bars. The handle means may be flexible, in the form of reins, and thus transfer load through tension only. Alternatively, the handle means may be rigid, in the form of handle bars, and thus be able to transfer load in tension, compression or in flexure. In both cases, the handle means may provide a positive transfer of weight, increasing control of the air board.

The support arrangement may include a fan assembly for providing an air flow. The fan assembly may be of the centrifugal type including a fan impeller for providing a radial air flow therefrom. It is also envisaged that the fan assembly may be of the axial type. The fan impeller may be driven for rotation by an internal combustion engine. An alternative power source such as an electric motor could however also be used.

According to one preferred embodiment of the present invention the fan impeller may be driven for rotation about an at least substantially vertically aligned rotational axis.

The fan assembly may further include a fan support which may be located under the platform. The fan support may include a top panel and a bottom panel, with the fan impeller being located between the top and bottom panels. The top panel may include a fan aperture positioned over the fan impeller, and air may be drawn in the space provided between the platform and the top panel through the fan aperture to the impeller. The bottom panel may support the power source and the fan impeller. Air may then be delivered from the fan impeller from between the top and bottom panels.

According to another preferred embodiment of the present invention the fan impeller may be driven for rotation about an at least substantially horizontally aligned rotational axis. Air may enter through at least one opening provided at the front portion of the platform. The amount of air flow, and therefore lift, may be controlled by the operator through an engine throttle control mounted on the handle means. In the event of the operator falling off or otherwise losing control of the air board, the engine/motor may revert to an idle state and the air board may settle gently and safely to the ground.

The support arrangement may further include a continuous inflatable skirt located adjacent the periphery of the platform. The skirt, when inflated may for example have the form of an annular tube, and the platform may be generally circular in shape. Other platform shapes, and therefore skirt configurations, are also envisaged. The fan may inflate the skirt during operation of the air craft. The air flow may be received from the fan from between the top and bottom panels of the fan support. Air escaping from the skirt may act to support the air board. The air may escape from the skirt into an inner volume defined within the confines of the skirt under the platform. The air may also escape from the skirt arid/or from the inner volume between the base of the inflatable skirt and the surface above which the air board is supported.

A surface contact means may also be provided within the inner volume of the air board for contacting the surface upon which the air board is supported during certain turning motions or during braking of the air board.

The surface contact means may include a series of legs extending under the platform. Alternatively, the surface contact may include an annular ring or brushes supported away from the bottom panel of the fan support. The surface contact means can act to assist the air board to turn. Furthermore, the surface contact means can provide a brake to stop the air board.

During a straight cruising motion of the air board, the platform and inflatable skirt may hover above the surface, with the inflatable skirt not contacting the surface. When the air board is turning, the weight transfer can result in a portion of the inflatable skirt contacting the ground. This results in a relatively gentle turning of the air board in the direction where the skirt is contacting the surface. Also, a relatively gentle braking can occur to slow or stop the motion of the air board. Where more severe braking or turning is required, the weight transfer may be increased such that the surface contact means contacts the surface above which the air board is hovering. The point of contact of the surface contact means can then provide an additional point of contact about which the air board can turn. Furthermore, the contact by the surface contact means can rapidly stop the motion of the air board.

The surface contact means may also include one or more wheels which can provide improved directional stability for the air board. The or at least one of the wheels may be powered to thereby provide an additional propulsion means for the air board as required. When in a hovering state, the wheels are not in contact with the surface. However, with a change in the weight distribution in order to effect a turn, one or more wheels may make contact with the surface. Where the surface contact means is a leg or annular ring, motivation in the desired direction may be as a result of the biased air flow. As the air board begins to move in the desired direction, the surface contact means can drag on the ground, creating a useful brake.

In addition to shifting weight over the drive wheel, causing it to contact the ground, means may be provided to engage the drive wheel to the engine or to allow it to free-wheel as desired by the operator. The engagement of the wheel to the engine may be done by a clutch control lever mounted on the handle means.

Where the surface contact means includes a set of wheels, as the air board begins to move, there is no such hindrance to motion, and the air board can move freely, allowing greater maneuverability, at higher speeds.

Also, where the at least one wheel is powered for rotation, this facilitates fast and accurate change in direction of the air board. The wheels can also act to accelerate the air board in a particular direction by urging the wheels against the support surface. This can be achieved by shifting the weight distribution of the operator to over the wheels of the air board.

This preferred embodiment may therefore provide for a means of propulsion. When the air board is in a stationary position, the operator may distribute his weight over at least one powered wheel, bringing the wheel in contact with the surface. The flow of air will tend to bias the air board in the forward direction, and the wheel can then act as a drive mechanism to permit the air board to accelerate in the forward direction.

Alternatively, the surface contact means may also include a flexible low friction device, which provides sufficient friction to create a point of rotation, without providing a serious braking action to the motion of the air board.

As discussed, the air board has significant advantages over skate boards and the like with its ability for rapid changes in direction. The surface contact means, as legs possess the ability to brake, and as wheels further possess the ability to accelerate the air board during a turning maneuver, through making a substantially solid contact with the surface. However, in some circumstances, it may be preferable for the air board to make only subtle changes in direction, and thus a solid contact may not always be ideal. In this instance, having a flexible low friction device permits a small braking force, sufficient for the operator to make subtle direction changes, without seriously hindering the speed of the air board.

Such a flexible low friction device may be a brush, that is a plurality of bristles that extend towards the surface, and are free to deform during the turning maneuver. The stiffness of the bristle mass provides sufficient friction to the surface to effect the change in direction, but is flexible enough not to provide a brake to the air board.

A further advantage of the air board according to the present invention over skateboards and the like is that the air board can also slide sideways. Therefore, the air board is not restricted to traveling in a curved path when turning, but can also travel in a right angle path if so required.

The air board may be initially pushed along by the operator to propel the air board forward. Alternatively, a further propulsion means such as, for example, a jet outlet or propeller could be used to propel the air board. The further propulsion means may provide a degree of directional control, for example by using a directional vane downstream of the propeller. It is however preferable for the main directional control to be provided by the change of weight distribution by the operator of the air board. This form of directional control can provide more accurate and precise control of the movement of the air board according to the present invention.

It will be convenient to further describe the invention by reference to the accompanying drawings which illustrate preferred embodiments of the air board according to the present invention. Other arrangements of the invention are possible and consequently the particularity of the accompanying drawings is not to be understood as superseding the generality of the proceeding description of the invention.

Figure 1:
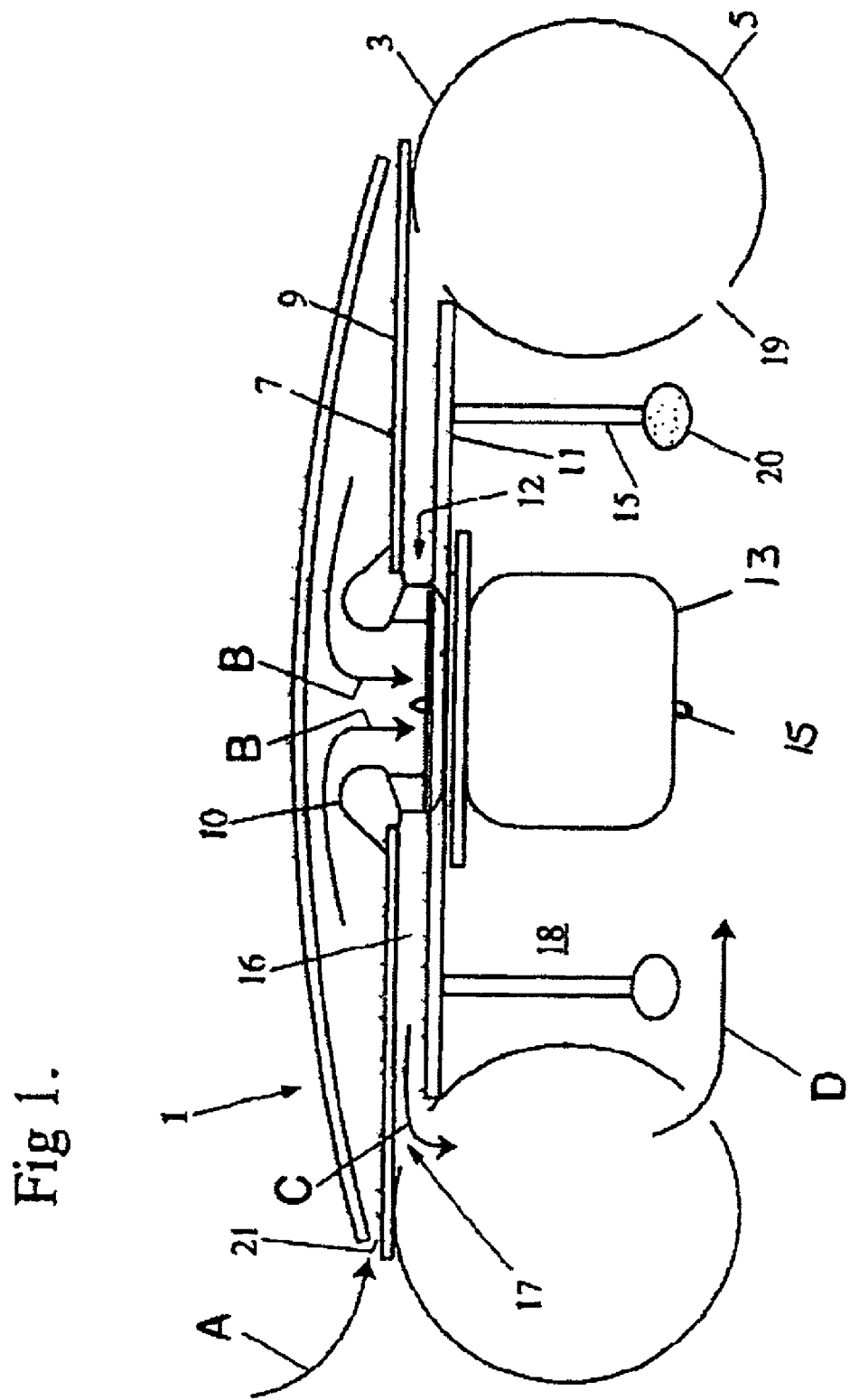
FIG. 1 is a cross-sectional view of a preferred embodiment of an air board according to the present invention.

FIG. 1 shows the major components of a first preferred embodiment of the air board according to the present invention. The air board includes a platform 1 upon which an operator 2 of the air board can be supported. The operator 2 is shown in a standing position in FIGS. 2 to 4. It is however to be appreciated that the operator could also be crouching on or be sitting on the platform 1.

The air board further includes support arrangement 3 at least substantially located under the platform 1. The support arrangement 3 includes a continuous inflatable skirt 5 located under the periphery of the platform 1. The platform 1 is generally circular in shape, and the inflatable skirt 5, when inflated, is in the form of an annular tube.

The support arrangement 3 further includes a fan assembly 7 located under the platform 1. The fan assembly 7 includes a top panel 9 and a bottom panel 11 defining an air space 16 therebetween. The bottom panel 11 supports a fan impeller 12 powered by an internal combustion engine 13. The top panel 9 includes a fan aperture 10 located immediately above the fan impeller 12. When the fan impeller 12 is rotating, an air flow A can be drawn through the gap 21 provided between the platform 1 and the top panel 9. An air flow B can then be provided through the fan aperture 10 to the fan impeller 12. The fan impeller 12 is of a centrifugal type which delivers an air flow C radially through the air gap 16 to the inflatable skirt 5. As is evident from FIG. 1, when the engine 13 is mounted below the bottom panel 11 and the fan impeller 12 is a centrifugal type delivering radial air flow above the panel 11, the drive shaft 15 of the engine 13 is perpendicular to the platform 1. At least one opening 17 is provided in the inflatable skirt 5 to allow the air flow C into the inflatable skirt 5. The opening 17 may be provided by a single continuous slot aligned with the air space 16. Alternatively, a series of openings 17 may communicated with the air gap 16.

A series of openings 19 are also provided along a lower portion of the inflatable skirt 5 to allow an air flow D to escape therefrom. This air flow D flows into an internal volume 18 provided within the confines of the skirt 5 under the bottom panel 11. Alternatively or in addition, the air flow D may also pass between the skirt 5 and a surface 6 upon which the air board is hovering as shown in FIGS. 2 and 4.

Surface contact means 15 are provided in this inner volume 18. The surface contact means 15 can for example be in the form of a plurality of legs extending from the bottom panel 11. A skid portion 20 can be provided at the peripheral end of each leg 15. Alternatively, the skid portion 20 can be in the form of an annular ring supported by a series of legs 15.

Figure 2:
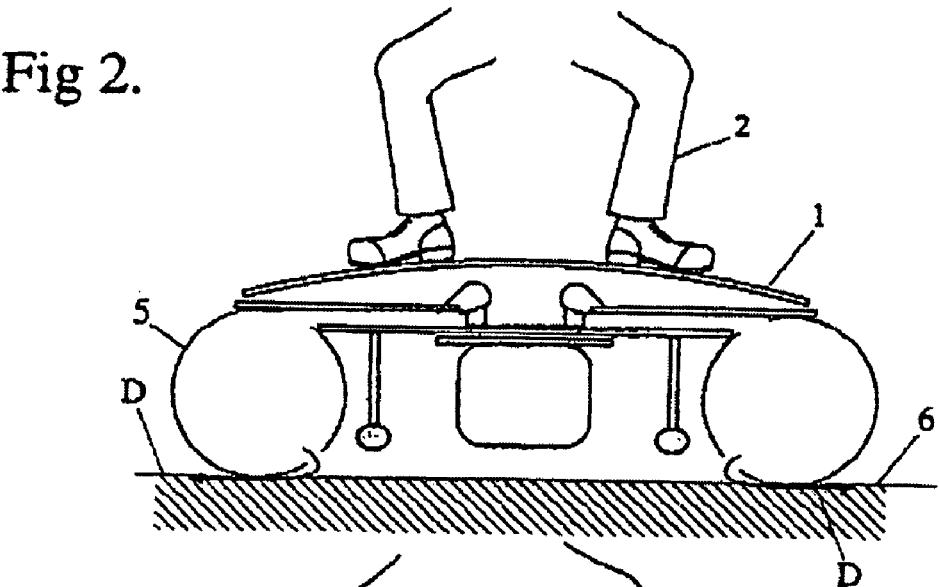
FIG. 2 is a cross-sectional view of the air board of FIG. 1 when in a cruising position.
Figure 3:
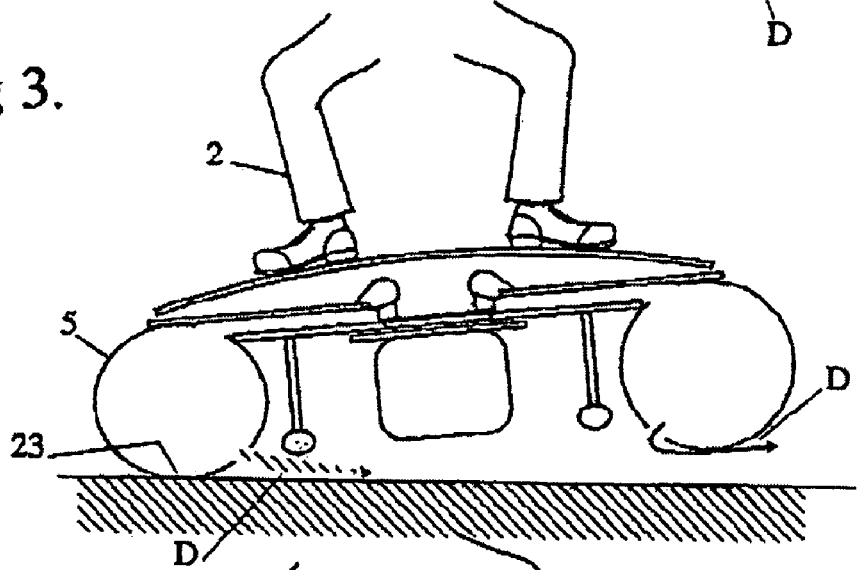
FIG. 3 is a cross-sectional view of the air board of FIG. 1 during gentle turning or braking.
Figure 4:
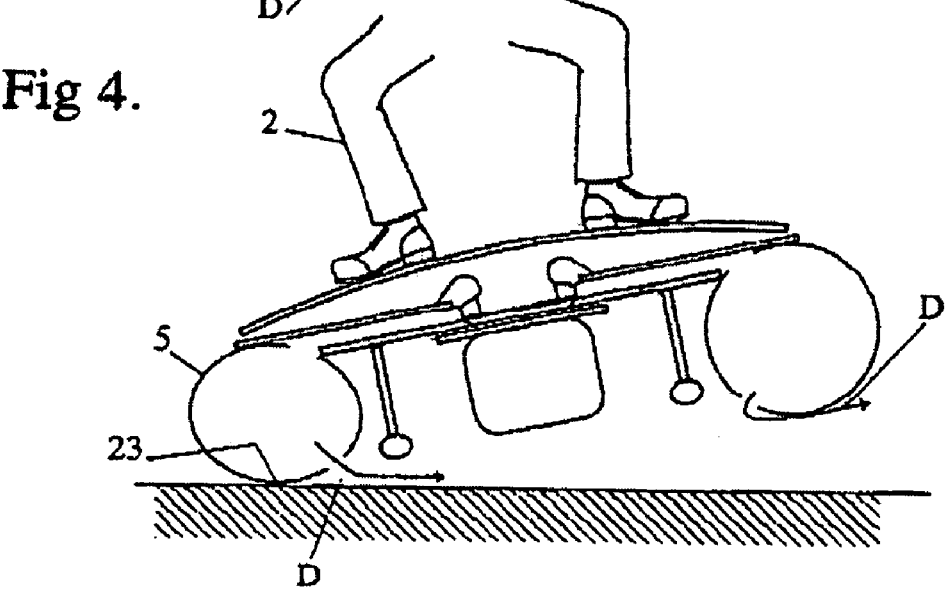
FIG. 4 is a cross-sectional view of the air board of FIG. 1 during severe braking or turning.

The operation of the air board is shown in more detail in FIGS. 2 to 4. FIG. 2 shows the air board in a cruise position with an operator 2 standing on the platform 1. The operator has adjusted his or her position, such that there is a generally equal weight distribution along either side of the air board 1. Therefore, at least a portion of the air flow D flowing from the skirt 5 passes between the skirt 5 and the surface 6 upon which the air board is hovering. This air flow generally supports the air board such that no portion of the skirt 5 touches the surface 6.

When gentle turning of the air board is required, the operator shifts his or her weight towards the direction that the air board is to turn. The change in weight distribution of the operator 2 results in a degree of inclination of the platform 1. This causes in a portion 23 of the skirt 5 to touch the surface 6. This results in a gentle turning in the direction where the skirt 5 touches the surface 6, the contact point of the skirt 5 providing a point of rotation of the air board. Because the skirt 5 is touching the surface 6, this also provides a degree of braking of the movement of the air board which slows down its motion.

Where the air board needs to be more severely turned or needs to be quickly stopped, then additional weight can be applied by the operator 2 to one side of the platform 1. This results in a greater contact by the skirt 5 to the surface 6 as shown in FIG. 4. Furthermore, the skid 20 can also contact the surface 6. This greater contact by both the skirt 5 and the skid 20 results in a more abrupt turn of the air board as well as faster stopping of the air board as so required.

Figure 5:
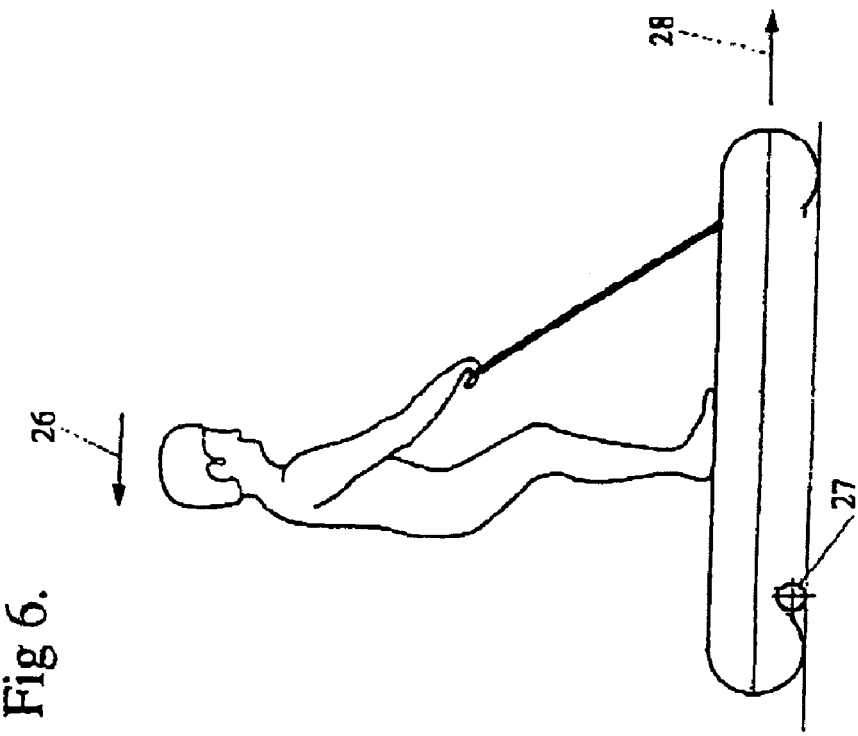
FIG. 5 is a cross-sectional side view of another preferred embodiment of an air board according to the present invention.
Figure 6:
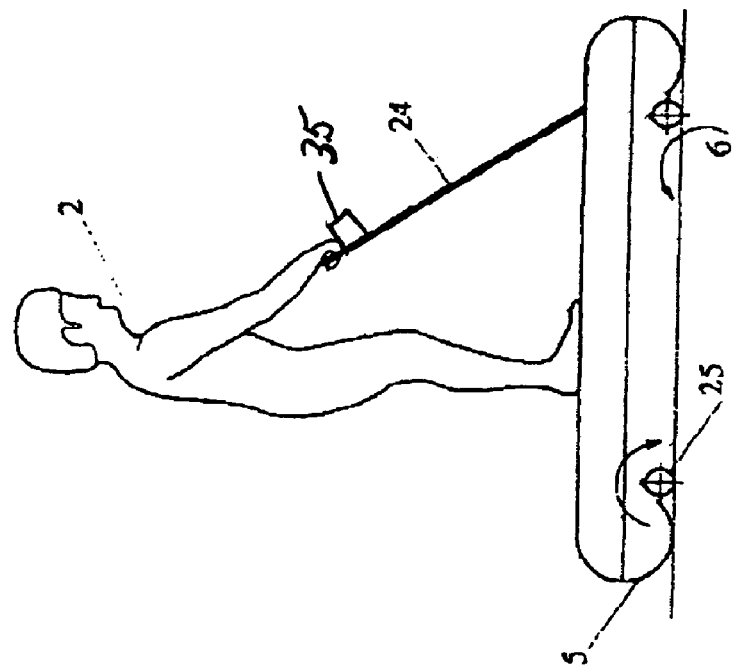
FIG. 6 is a cross-sectional view of the air board of FIG. 5 during forward acceleration.

FIGS. 5 and 6 show another preferred embodiment of the present invention, where one or more powered wheels 25 is used in addition to or as a replacement for, the skid portion 20. The wheel 25 assists in driving the air board in a desired direction, through providing a low friction contact with the surface 6. Where contact with the surface by the skid 20 providing a braking action, the wheels 25 provides a similar point of rotation, but does not brake the air board, providing for greater speed and maneuverability. As the wheels 25 can be placed at any point of the skirt 5 periphery, the air board can be configured for high speed maneuvering, for more experienced operators 2. In this configuration of figures 5 and 6, the wheels have been placed at the rear portion of the air board to improve directional stability. Further, the air board has also been equipped with handle bars 24, which serve to provide greater stability and control to the operator by assisting with the shift in weight distribution during a turn or similar maneuver. The handle bars 24 also a provide convenient position for the engine throttle shown in FIG. 6 as throttle 35, so that the operator can control the engine directly whilst operating the air board. FIG. 6 shows the operator 2 distributing his weight 26 backwards by leaning back. This tends to urge the rear of the air board downward, bringing the wheels 25 and the skirt 5 into contact with the surface 6 at a point 27. As the operator is supported by the handle bars 24, the forward portion of the air board is consequently raised. Thus, as the air flow through the skirt 5 restricted at the rear portion, and the wheels 25 are in contact at the same point 27, the differential air flow through the entire skirt will tend to bias the air board away from point 27, and thus, the wheel 25 can act as a form of drive, propelling the air board forward 28.

Figure 7:
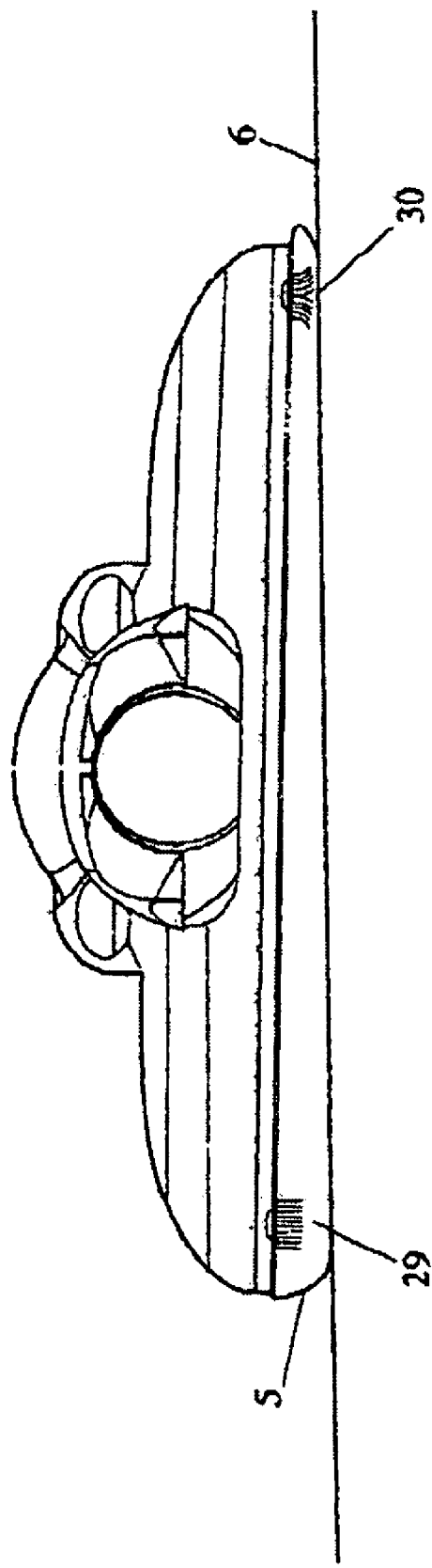
FIG. 7 is a cross-sectional side view of further preferred embodiment of an air board according to the present invention.

FIG. 7 show a further preferred embodiment of the present invention, in that the skids 20 are replaced by brush 29 about the periphery of the skirt 5. Whereas the skids provide a braking action on contact with the surface 6, the brush 29 is designed to have provide significantly less friction to the surface 6, and thus the air board will tend to turn more subtly. As with the skids 20, as the operator's weight distribution is varied, the air board will tilt, bringing a portion of the peripheral brush 30 into contact with the surface. As the friction resulting from this contact is dependent on the stiffness of the bristles of the brush 30, and the degree of tilt of the air board, the operator is able to vary the turning force required by, in the first instance, adding specific bristles to the brush 30, and in operation, the force applied through the brush 30 will depend on the distributed weight. Thus, whereas the braking force applied by the skids 20 is either applied or not, the stiffness of the bristles provide a greater degree of control as the frictional force can be applied gradually. This has the advantage of allowing the operator to select either subtle or dramatic turns.

The above description is provided for the purposes of exemplification only and it will be understood by the person skilled in the art that modifications and variations may be made without departing from the invention as defined in the appended claims.

The invention claimed is:

1. A ground-effects vehicle for movement over a surface, said vehicle comprising:
   a platform;
   a propulsion system for moving said vehicle with respect to said surface in a principal travel direction, said propulsion system being connected to said platform;
   an annular inflatable member adjacent the outer periphery of said platform and beneath said platform, said annular inflatable member being disposed to form a supporting airspace beneath said platform and inside said annular inflatable member;
   a source of air pressure for directing air, at greater than ambient pressure, to said airspace and said annular inflatable member such that said vehicle can be supported by air pressure above said surface; and
   at least one surface engaging member, within said supporting airspace, said surface engaging member being disposed to selectively engage said surface only when said platform is tilted by being spaced vertically from said surface a sufficient distance from said surface such that said at least one surface engaging member engages said surface only when said platform is tilted when said vehicle is supported by air pressure above said surface, said at least one surface engaging member also being spaced from the center of said platform a sufficient distance from said center to generate a turning force to said vehicle such that said vehicle deviates from said principle principal travel direction when said surface engaging member engages said surface.

2. The vehicle of claim 1, wherein the pitch, yaw, or both pitch and yaw of said platform is varied by a human operator on said platform.

3. The vehicle of claim 2 including a control member affixed at to said platform extending above said platform by which an operator can tilt said platform by applying force to said control member.

4. The vehicle of claim 3, wherein the control member comprise handle bars.

5. The vehicle of claim 4, wherein the control member includes a throttle for controlling the introduction of said air to said airspace.

6. The vehicle of claim 3, wherein the pitch, yaw, or both pitch and yaw of said platform is varied by a human operator on said platform by changing the weight distribution on said platform.

7. The vehicle of claim 1, wherein said surface engaging member comprises a brush-like member.

8. The vehicle of claim 1, wherein said surface engaging member comprises at least one wheel.

9. The vehicle of claim 8, wherein at least one wheel is driven.

10. The vehicle of claim 8, wherein said surface engaging member further includes at least one brush-like member.

11. The vehicle of claim 1, wherein said surface engaging member comprises a plurality of legs.

12. The vehicle of claim 1, wherein the annular inflatable member comprises a continuous inflatable tubular member through which said air at greater than ambient pressure flows.

13. The vehicle of claim 1, wherein said propulsion system includes a motor.

14. The vehicle of claim 13, wherein said motor has a drive shaft generally perpendicular to the plane of said platform.

15. The vehicle of claim 13, wherein said motor comprises an internal combustion engine.

16. The vehicle of claim 13, wherein said motor comprises an electric motor.

* * * * *